(12) United States Patent
Smith

(10) Patent No.: US 8,677,671 B2
(45) Date of Patent: *Mar. 25, 2014

(54) FIREARM BARREL CLEANING PATCHES (CIP)

(76) Inventor: Shane Patrick Smith, Los Angeles, CA (US)

(*) Notice: Subject to any disclaimer, the term of this patent is extended or adjusted under 35 U.S.C. 154(b) by 2 days.

This patent is subject to a terminal disclaimer.

(21) Appl. No.: 13/494,891

(22) Filed: Jun. 12, 2012

(65) Prior Publication Data

US 2012/0272560 A1    Nov. 1, 2012

Related U.S. Application Data

(63) Continuation-in-part of application No. 13/059,228, filed as application No. PCT/US2009/004677 on Aug. 14, 2009, now Pat. No. 8,196,330.

(60) Provisional application No. 61/189,179, filed on Aug. 15, 2008.

(51) Int. Cl.
 *F41A 29/02* (2006.01)
 *B08B 1/00* (2006.01)
 *B23P 11/00* (2006.01)

(52) U.S. Cl.
 USPC .......................................................... 42/95

(58) Field of Classification Search
 USPC .................. 42/95; 102/442, 529; 15/104.165, 15/229.3, 229.7
 See application file for complete search history.

(56) References Cited

U.S. PATENT DOCUMENTS

| | | |
|---|---|---|
| 209,276 A | 10/1878 | Longden |
| 330,619 A | 11/1885 | Reed |
| 363,951 A | 5/1887 | Forster |
| 373,747 A | 11/1887 | Mansfield |
| 460,986 A | 10/1891 | Odell et al. |
| 478,190 A | 6/1892 | Hamilton |
| 621,857 A | 8/1899 | Scott |
| 1,291,131 A | 1/1919 | Radel |
| 1,427,582 A | 8/1922 | Cumpston |
| 1,591,425 A | 6/1926 | Kingman |
| 1,610,649 A | 12/1926 | Bair |
| 1,745,575 A | 2/1930 | Hooker |
| 2,236,123 A | 12/1938 | Pierce |
| 2,537,149 A | 1/1951 | McKean |
| 2,782,419 A | 5/1954 | Swartz |
| 2,765,740 A | 10/1956 | Norman |
| 2,862,218 A | 12/1958 | Krone |
| 2,980,941 A | 12/1958 | Miller |
| 2,877,482 A | 3/1959 | Roy |
| 3,064,294 A | 7/1960 | Stocking |
| 3,205,518 A | 6/1963 | Romaine |
| 3,100,904 A | 8/1963 | Stocking |
| 3,136,614 A | 6/1964 | Kuzmick |

(Continued)

FOREIGN PATENT DOCUMENTS

GB  2033558 A  5/1980

*Primary Examiner* — Bret Hayes
(74) *Attorney, Agent, or Firm* — Cislow & Thomas, LLP

(57) ABSTRACT

A planar triangular patch for cleaning firearm bores. The patch has similarly sized notches placed centrally along the edges of the patch, permitting a level of pleating as the patch is inserted into a firearm bore and wraps around a jag. The patch is made of a material design to clean and preserve the interior of a firearm bore and applies uniform pressure against the bore as it presents the face of its longest radius to the bore interior, cleaning the entire bore simultaneously.

20 Claims, 5 Drawing Sheets

(56) References Cited

U.S. PATENT DOCUMENTS

| | | |
|---|---|---|
| 3,262,557 A | 7/1966 | Pucci |
| 3,377,643 A | 4/1968 | Teng et al. |
| 3,682,556 A | 8/1972 | Hanson |
| 3,739,420 A | 6/1973 | Kafkis |
| 3,745,589 A | 7/1973 | Borsing |
| 3,861,993 A | 1/1975 | Guthrie |
| D245,473 S | 8/1977 | Heninger |
| 4,050,175 A | 9/1977 | Mulinix |
| 4,175,493 A | 11/1979 | Daily |
| 4,328,632 A | 5/1982 | Beers |
| 4,344,278 A | 8/1982 | Jamison et al. |
| 4,399,627 A | 8/1983 | Malesky |
| 4,499,625 A | 2/1985 | Bottomley |
| 4,606,183 A | 8/1986 | Riggs |
| 4,702,028 A | 10/1987 | Dahlitz |
| 4,716,673 A | 1/1988 | Williams |
| 4,962,607 A | 10/1990 | Baldwin |
| 4,967,439 A | 11/1990 | LaLonde |
| 5,171,925 A | 12/1992 | Mekler |
| 5,337,505 A | 8/1994 | Brown et al. |
| 5,435,090 A | 7/1995 | Darrow |
| 5,450,795 A | 9/1995 | Adelman |
| 5,557,871 A | 9/1996 | LaLonde |
| 5,588,242 A | 12/1996 | Hughes |
| D384,507 S | 10/1997 | Mudie |
| 5,691,501 A | 11/1997 | Gilbert |
| 5,815,975 A | 10/1998 | Rambo et al. |
| 5,829,088 A | 11/1998 | Ujihara |
| 5,839,150 A | 11/1998 | Miyaoka |
| 5,920,940 A | 7/1999 | Kauska et al. |
| 5,983,550 A | 11/1999 | Skaar |
| 6,105,591 A | 8/2000 | DeCare |
| 7,030,306 B1 | 4/2006 | Chang |
| D566,285 S | 4/2008 | Park |
| 7,367,151 B1 | 5/2008 | Black et al. |
| D576,367 S | 9/2008 | Anderson et al. |
| D659,323 S * | 5/2012 | Davis .............................. D32/43 |
| 8,196,330 B2 * | 6/2012 | Smith .............................. 42/95 |
| 2002/0056219 A1 | 5/2002 | Solberg et al. |
| 2006/0236584 A1 | 10/2006 | Williams |
| 2006/0242881 A1 | 11/2006 | Riebling |
| 2007/0266610 A1 | 11/2007 | Coffield, III |

* cited by examiner

FIREARM BARREL CLEANING PATCHES (CIP)

This application is a continuation-in-part of U.S. patent application Ser. No. 13/059,228, filed Feb. 15, 2011, now U.S. Pat. No. 8,196,330, which is a national phase entry application of PCT/US09/04677, filed Aug. 14, 2009, which claims the benefit of the filing date of provisional application No. 61/189,179, filed Aug. 15, 2008, which applications are all incorporated in their entirety here by this reference.

TECHNICAL FIELD

Background

The number of guns owned by civilians in the United States is estimated at about 250 million. These firearms have bores or barrel tubes through which projectiles travel. As firearms operate, carbon, lead or other materials gradually form accretions on the interior of the bore. Because of its elongated shape and small diameter, there is limited access, making the bore a particularly difficult area to clean. As accretions form on the bore interior, they interfere with projectiles travelling through the bore, affecting both velocity and accuracy.

Preserving accuracy and firearm performance requires regular bore maintenance including lubricating, polishing and cleaning to remove debris accumulations. Cleaning and debris removal must be done carefully, however, as damage to the rifling lands of the bore can permanently damage the firearm. A bore from which excessive material is removed increases the bore diameter, potentially leading to casing rupture.

One common cleaning method to avoid damage uses small pieces of cloth-like material or "patches" as they are called in the art. As a user draws a patch through the bore, friction between the patch and bore interior surface causes debris to adhere to the patch, which carries it away. For this reason, the structure and composition of patches are considerably important. A patch fitting too loosely inside a bore won't clean sufficiently. A patch fitting too tightly may become lodged in the bore and users may damage the bore interior attempting to dislodge the patch.

For optimum firearm performance, there is a need for a patch that will clean evenly, not favoring one area of the bore circumference while neglecting another, and for a patch that presents the greatest cleaning area along the length of the bore interior. Therefore it is an object of the present invention to provide a bore patch that evenly cleans the entire bore circumference, while providing the longest contact length along the bore. Another object is to provide patches that fold uniformly in the same configuration without assistance from a user. Another object of the invention is to provide a patch that creates sufficient pressure between a jag and firearm bore to clean accumulated debris from the bore without creating enough pressure to become stuck inside the bore. These and other objects will become apparent through the appended summary, description and claims.

SUMMARY

The present invention is a greatly improved gun bore cleaning patch typically used with a jag to remove residue and build up. The patch is substantially planar and, preferably, triangular. Although various other three-sided triangles such as isosceles, right or scalene triangles can be used, an equilateral triangle is preferred since it presents the greatest uniform distance from the triangle center to the tips of the patch and promotes uniform pleating of the patch material as it enters a bore.

The patch has cut-outs or notches along its edges to provide room for extra material as the extreme ends fold and pleat in use. The notches are preferably located at the center along each edge of the patch. In various cases, they may be a variety of shapes and they may be off center. The shape and positioning of each notch corresponds to the shape of the patch in order to allow the proper amount of material layering.

When the patch is inserted into a bore, a number of pleated layers is present. As more layers of patch occur, more friction occurs. With too many layers, the pressure between the jag and bore would cause the patch to stick inside the bore or dislodge from the jag. With insufficient layering, the patch would not dislodge debris in the bore.

In a manner similar to the notches, openings may be disposed in a patch. Openings differ from notches in that the openings are created inside the perimeter edge of the patch rather than on the perimeter edge. The size and positioning of openings, like the notches, depends on the size and shape of the patch since the openings serve the same space-saving function as notches. In some embodiments, the openings are disposed symmetrically to cause even folding and pleating of the patch material. In some embodiments, it is not necessary to dispose the openings in a symmetrical fashion.

The patch may have holes, slits, or similarly restrictive shapes to accommodate a cable or rod affixed to the patch. Differing positions of the holes causes different parts of a patch to be exposed to the bore wall.

The patch can be made of various materials. Animal, plant, metallic/mineral or synthetically derived materials are contemplated and may be woven, non-woven, napped, and knitted. Various properties may be imparted these materials to affect the patch absorbency, elasticity, flexibility and the degree of napping.

The patch may comprise material embedded in its fabric. Patches may be soaked with liquids for cleaning, chelating, lubricating, polishing and protecting the bore interior. Abrasives may be embedded into wet or dry patches to assist cleaning.

A backing material may be adhered to the surface of the patch imparting properties not found in the core patch material, such as rigidity, flexibility and elasticity. The backing may be made of paper, natural fabric, synthetic materials or mesh. In another preferred embodiment, the patch may comprise an agent for cleaning, polishing or lubricating.

To use the device, a patch is wrapped around a jag. Additionally, the patches may be slipped inside a slotted jag, or through a jag eyelet. Bore brushes may also be used. A patch is wrapped around a sub-caliber bore brush to which the patch adheres. Prior to use, a patch may be soaked or wetted with solvent to clean black powder or smokeless powder by-products, metal oxides, rust, other corrosion, or debris. Patches may also use preservatives and materials to preserve and protect the condition of the bore.

A patch is centered on a brush or jag and aligned with the barrel of a firearm. As the brush is pushed into the barrel, the patch folds over the jag and the edges of the patch begin to pleat. Once inside the bore, by reciprocating action, the patch scrubs away debris from the bore interior. In addition to cleaning, the patch may be wrapped around spherical shot or other projectiles and inserted into a bore to serve as wadding.

An advantage of the triangular shape of the patches is that they may be manufactured using a tessellated die to produce very little or no waste. To manufacture the patches, the material comprising the patches is assembled in multi-layered sheets. A die comprising the triangular pattern tessellated into a mosaic pattern so that adjacent triangles share common sides is used to cut through the material under pressure. Using this technique, only the material cut out to form notches or holes is wasted.

DETAILED DESCRIPTION OF THE INVENTION

Figure 1:
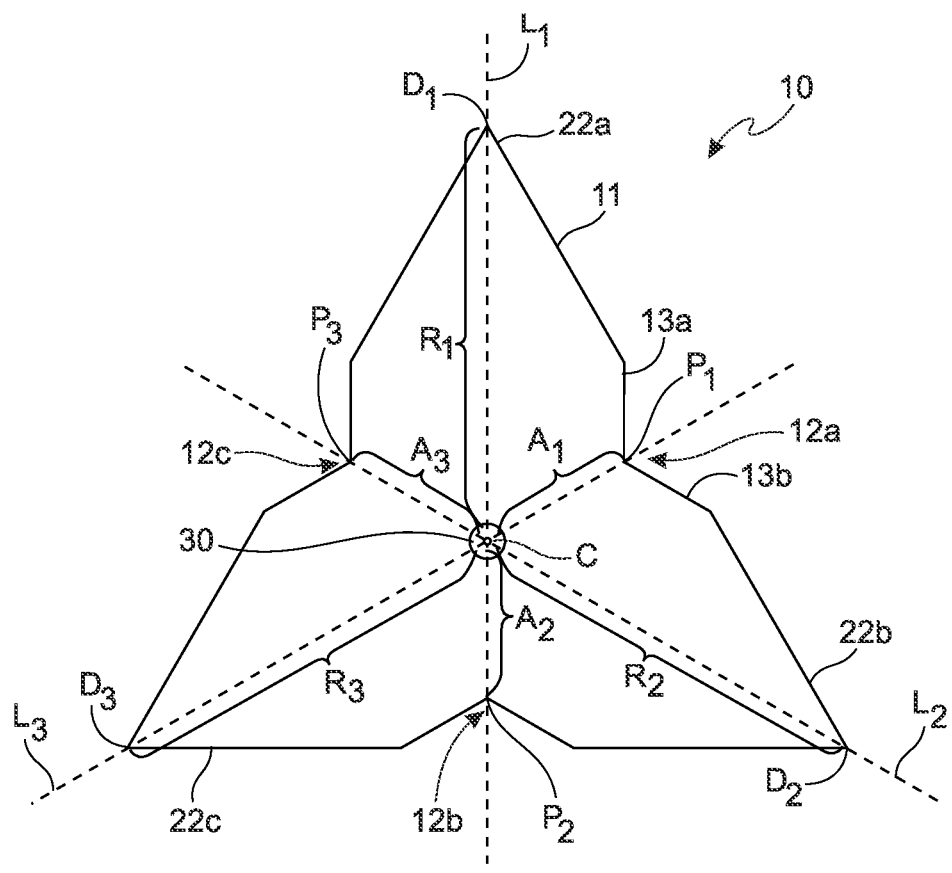
FIG. 1 is a top view of a triangular firearm cleaning patch.

The present invention comprises an improved firearm bore cleaning patch for use with a jag or other supporting device to remove residue that builds up by accretion through firearm use. Referring to FIG. 1, the patch 10 is a substantially planar piece of material defined by a perimeter edge 11 and having a center C, terminal ends 22a, 22b, 22c, and notches 12a, 12b, 12c within the perimeter edge. The point on each terminal end 22a, 22b, 22c furthest from the center is referred to as the distal point D. The distance from the distal point D1, D2, or D3 to the center C is referred to as the radius R1, R2, or R3, respectively. The point on the notch 12a, 12b, 12c closest to the center C is referred to as the proximal point P1, P2, or P3. The distance from the proximal point P1, P2, or P3 to the center C is referred to as the apothem A1, A2, or A3, respectively.

Figure 7:
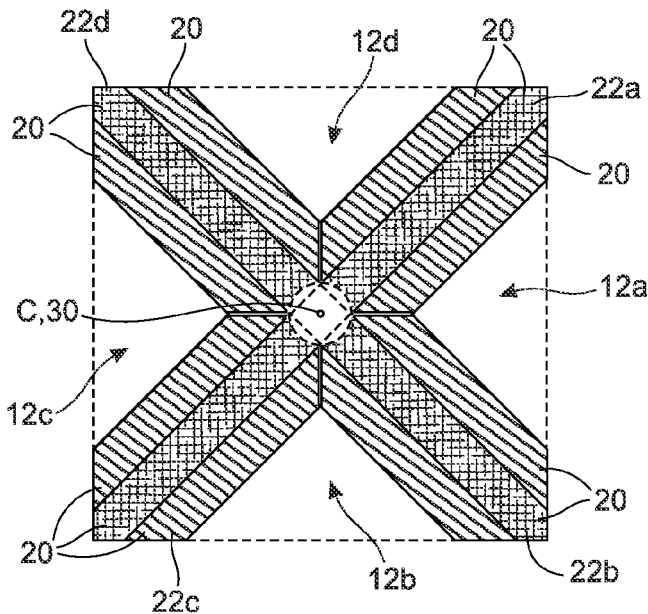
FIG. 7 is a top view of another embodiment of a cleaning patch with the raw material cut away shown in broken lines.
Figure 8:
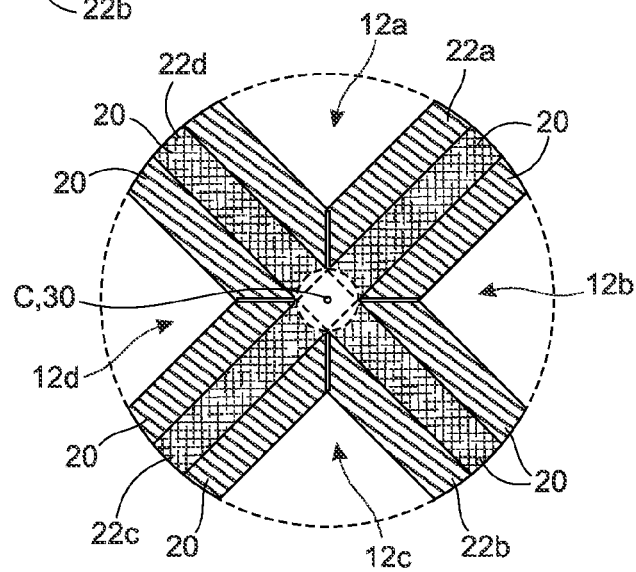
FIG. 8 is a top view of another embodiment of a cleaning patch with the raw material cut away shown in broken lines.
Figure 9:
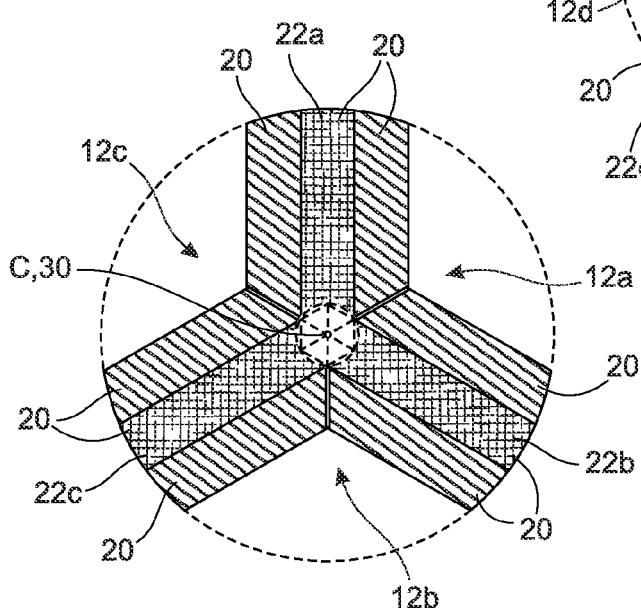
FIG. 9 is a top view of another embodiment of a cleaning patch with the raw material cut away shown in broken lines.

In the preferred embodiment the patch 10 is in the shape of a triangle. Although various three-sided polygons such as isosceles, right or scalene triangles can be used, in the preferred embodiment, an equilateral triangle is used. In addition, square, rectangular, circular, and other shaped patches can be used to create notches to create a patch 10 of the present invention as shown in FIGS. 7-9. Comparisons of the total areas of triangle shapes versus other shapes are shown in Table 1. In any table, the total patch areas are equal. The areas are set equal to the area given by a standard square patch or by a standard round (circular) patch. Therefore, in each table, the dimensions start from the value of 2s (where 2s is the length of one side of a rectangle), R (where R is the radius of a circle), 2u is the short side of a rectangle having a 2:1 ratio of long side to short side, 2t is the short side of a rectangle having a 4:1 ratio of long side to short side, and a is the distance from the center of a triangle to a point perpendicular to a leg of the triangle, and the area of the indicated shape is $(2s)^2 = 8u^2 = 16t^2 = 3\sqrt{3}a^2 = \pi \cdot R^2$.

TABLE 1

| Shape | Square | 2-by-1 rect | 4-by-1 rect | Triangle |
|---|---|---|---|---|
| Area Formula | $(2s)^2$ | $8 \cdot u^2$ | $16 \cdot t^2$ | $3\sqrt{3} \cdot a^2$ |

TABLE 2

| Shape | Round | Triangle |
|---|---|---|
| Area Formula | $\pi \cdot R^2$ | $3\sqrt{3} \cdot a^2$ |

Equilateral triangles are preferred, since they present the greatest uniform distance from the center to the tips of the triangle, and promote uniform pleating as the patch enters a bore. A comparison of triangle center to the apothem versus other shapes can be seen in the following tables. Difference ratios below are percents when multiplied by 100. The tables assume all areas are equal, i.e. $(2 \cdot s)^2 = \pi \cdot R^2 = 8 \cdot u^2 = 16 \cdot t^2 = 3\sqrt{3} \cdot a^2$

TABLE 3

| Shape | Square | Round | 2-by-1 rect | 4-by-1 rect | Triangle |
|---|---|---|---|---|---|
| Apothem | s | R | u | t | a |
| Apothem as a function of s | s | $\dfrac{2 \cdot s}{\sqrt{\pi}}$ | $\dfrac{s}{\sqrt{2}}$ | s/2 | $\dfrac{2 \cdot s}{3^{3/4}}$ |

Formulas for difference ratios are given as follows:

"Triangle versus Other Shape" = $\dfrac{\text{(other shape apothem)} - \text{(triangle apothem)}}{\text{(other shape apothem)}}$   Equation 1

"Cross versus Other Shape" = $\dfrac{\text{(other shape apothem)} - \text{(cross apothem)}}{\text{(other shape apothem)}}$   Equation 2

Difference ratios of different shapes are shown in Table 4.

TABLE 4

| Shapes | Exact | Approx. |
|---|---|---|
| Triangle versus Square | $1 - \dfrac{2}{3^{3/4}}$ | 0.123 |
| Triangle versus Round | $1 - \dfrac{\sqrt{\pi}}{3^{3/4}}$ | 0.222 |
| Triangle versus 2-by-1 rectangle | $1 - \dfrac{2\sqrt{2}}{3^{3/4}}$ | Neg 0.241 |
| Triangle versus 4-by-1 rectangle | $1 - \dfrac{4}{3^{3/4}}$ | Neg 0.755 |

A comparison of the radial lengths of various shapes is shown in the following:

TABLE 5

| Shape | Square | Round | 2-by-1 rect | 4-by-1 rect | Triangle |
|---|---|---|---|---|---|
| Radius | $\sqrt{2} \cdot s$ | R | $2 \cdot u$ | $4 \cdot t$ | $2 \cdot a$ |
| Radius as a function of s | $\sqrt{2} \cdot s$ | $\dfrac{2 \cdot s}{\sqrt{\pi}}$ | $\sqrt{2} \cdot s$ | $2 \cdot s$ | $\dfrac{4 \cdot s}{3^{3/4}}$ |

Difference ratios between different shapes are shown in Table 6.

TABLE 6

| Shapes | Exact | Approx. |
|---|---|---|
| Triangle versus Square | $\dfrac{2^{3/2}}{3^{3/4}} - 1$ | 0.241 |
| Triangle versus Round | $\dfrac{2\sqrt{\pi}}{3^{3/4}} - 1$ | 0.555 |
| Triangle versus 2-by-1 rectangle | $\dfrac{2\sqrt{2}}{3^{3/4}} - 1$ | 0.241 |
| Triangle versus 4-by-1 rectangle | $\dfrac{2}{3^{3/4}} - 1$ | Neg 0.123 |

In other embodiments, triangles with rounded sides, corners and side protrusions may be used, such as a Reuleaux triangle. In yet more embodiments, non-triangular shapes may be used, including rectangles, parallelograms, crosses, and other polygonal and non-polygonal shapes.

Still referring to FIG. 1, the patch has notches 12a, 12b, 12c disposed along the edge 11 of the patch to provide room for the extreme ends of the triangle as they fold and pleat when entering a firearm bore. In the preferred embodiment, the notches 12a, 12b, 12c are disposed on the edge halfway between two distal points and comprise a simple triangular cut. In various other preferred embodiments, the notches may comprise a variety of shapes including trapezoidal, domed, tapered or compound shapes. In further embodiments, the notches may be disposed off center. The shape and positioning of the notches corresponds to the shape of the patch in order to allow the proper amount of layering through pleating action.

Figure 2:
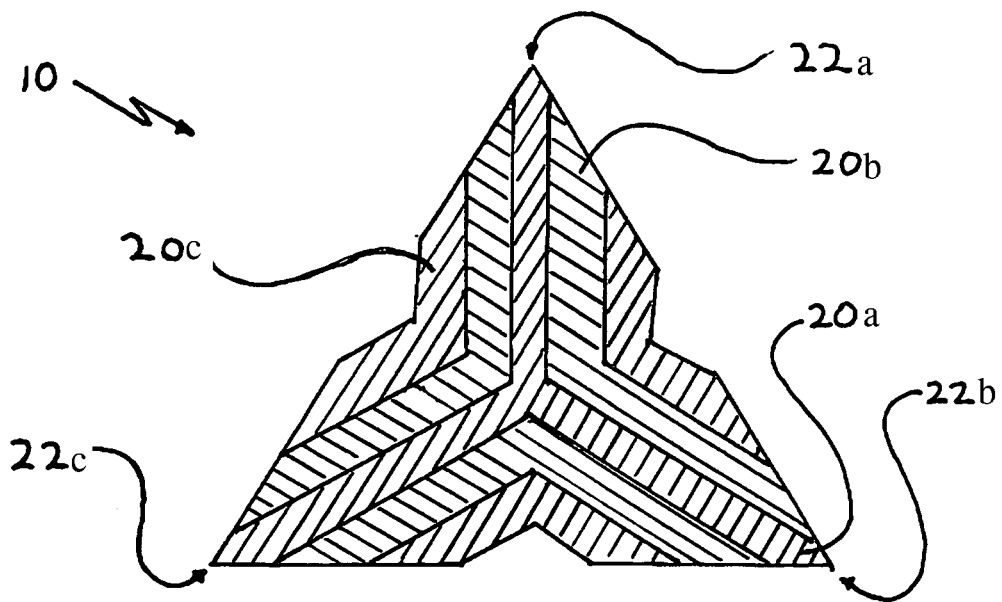
FIG. 2 is a top view of a triangular firearm cleaning patch showing the areas that fold and pleat as the patch enters a bore.

Referring to FIG. 2, the patch 10 is shown with the areas of pleating 20a, 20b, 20c illustrated. The areas of pleating correspond to the terminal ends of the triangle 22a, 22b, 22c, which are under the greatest tension as the patch 10 is used. Through this action, the area from the center C of the triangle to each end 22a, 22b, 22c contacts the bore interior and the folded pleating 20 creates pressure and contacts any other areas of the bore without contact. The differences between triangular pleating versus other shapes and the optimum number of pleats is shown in the following tables, wherein dimensions are in inches, areas in square inches, and ratios are percents when multiplied by 100:

TABLE 7

| Caliber | 22 | 223 | 243 | 25 | 25 | 30 |
|---|---|---|---|---|---|---|
| r | 0.107 | 0.109 | 0.118 | 0.125 | 0.125 | 0.145 |
| 2s | 1 | 1.25 | 1.25 | 1.25 | 1.75 | 2 |
| x/r | 3.1 | 3.8 | 3.6 | 3.4 | 4.7 | 4.6 |
| a/r | 4.1 | 5.03 | 4.6 | 4.4 | 6.1 | 6.1 |
| Fourcircle 5-layer area | 0.2227 | 0.5579 | 0.4782 | 0.4188 | 1.46015 | 1.87328 |
| Triangle 5-layer area | 0.072 | 0.2546 | 0.1963 | 0.1562 | 0.695531 | 0.896243 |
| Triangle 7-layer area | 0 | 0.000059 | 0 | 0 | 0.105825 | 0.120657 |
| Ratio fourcircle to triangle 5-layer | −2.09474 | −1.19164 | −1.43614 | −1.682 | −1.09934 | −1.09015 |

TABLE 8

| Caliber | 7.62 | 375 | 410 gauge | 40 | 45 | 45 |
|---|---|---|---|---|---|---|
| r | 0.1495 | 0.185 | 0.193 | 0.2 | 0.225 | 0.225 |
| 2s | 1.75 | 2.25 | 2.25 | 2.25 | 2.25 | 2.5 |
| x/r | 3.9 | 4.1 | 3.9 | 3.8 | 3.4 | 3.7 |
| a/r | 5.1 | 5.3 | 5.1 | 4.9 | 4.4 | 4.9 |
| Fourcircle 5-layer area | 1.13305 | 1.99309 | 1.86006 | 1.74598 | 1.35705 | 2.1059 |
| Triangle 5-layer area | 0.527339 | 0.949966 | 0.8268 | 0.778446 | 0.505994 | 0.924161 |
| Triangle 7-layer area | 0.002122 | 0.02001 | 0.002528 | 0 | 0 | 0 |
| Ratio fourcircle to triangle 5-layer | −1.14861 | −1.09807 | −1.15614 | −1.24291 | −1.68195 | −1.27872 |

TABLE 9

| Caliber | 50 | 50 | 20 gauge | 20 gauge | 12 gauge |
|---|---|---|---|---|---|
| r | 0.25 | 0.25 | 0.3 | 0.3 | 0.36 |
| 2s | 2 | 2.5 | 2.5 | 3 | 3 |
| x/r | 2.7 | 3.6 | 2.8 | 3.4 | 2.8 |
| a/r | 3.5 | 4.4 | 3.7 | 4.4 | 3.7 |
| Fourcircle 5-layer area | 0.473854 | 1.67537 | 0.909231 | 2.41253 | 1.30929 |
| Triangle 5-layer area | 0.084315 | 0.624684 | 0.201102 | 0.899545 | 0.289586 |
| Triangle 7-layer area | 0 | 0 | 0 | 0 | 0 |
| Ratio fourcircle to triangle 5-layer | −4.62004 | −1.68195 | −3.52124 | −1.68195 | −3.52125 |

Figure 3:
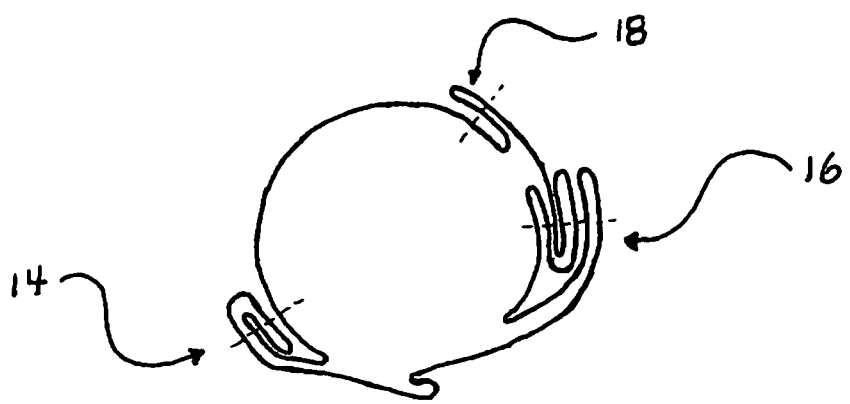
FIG. 3 is a cut-away view of a patch inserted into the bore of a firearm and exhibiting folding and pleating of the patch material.

Referring to FIG. 3, when the patch 10 is disposed in the bore, no more than five layers 14 of pleating should be present. As more layers accrue between a patch and the accretions inside the bore, more friction occurs. If too many layers 16 are present, the pressure between the jag and bore can cause the patch to dislodge from the jag and stick inside the bore. With insufficient layering 18, the patch generates insufficient friction to dislodge debris in the bore.

Figure 4:
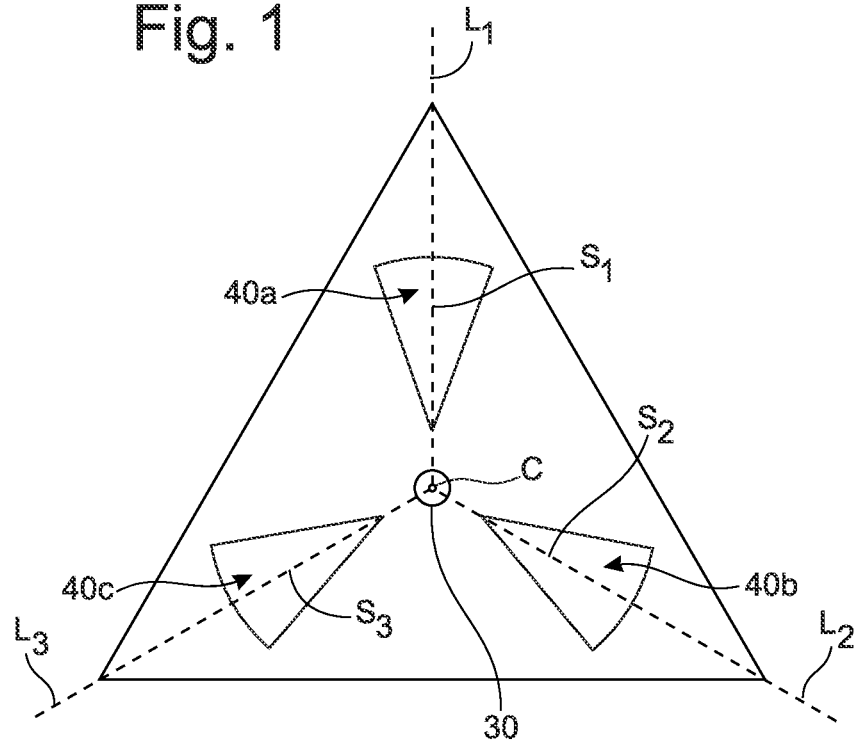
FIG. 4 is a top view of a triangular firearm cleaning patch with openings disposed in the surface.

Referring to FIG. 4, openings 40a, 40b, 40c may be disposed within the perimeter 11 of the patch 10 in lieu of or in addition to the notches. The size and positioning of openings 40a, 40b, 40c depends on the size and shape of the patch 10 since the openings 40a, 40b, 40c serve the same space-saving function as the notches 12a, 12b, 12c. Preferably, the openings 40a, 40b, 40c are disposed symmetrically to cause even folding and pleating of the patch material. More preferably, each opening 40a, 40b, 40c has an axis of symmetry S1, S2, S3 and one opening is provided along each of the longitudinal axes L1, L2, L3 as shown in FIG. 4.

In some embodiments, the patch may comprise a slit 30 or similarly restrictive hole to accommodate a cable, rod, jag, brush, and the like on which the patch 10 may be affixed. By positioning the slits or holes 30 in different positions, different parts of a patch can be exposed to the wall of the bore. Preferably, the hole or slit 30 is at the center of the patch 10. Other means for attaching the patch 10 to the cable, rod, jag, brush, etc., can be used such as a pinching or clamping device.

Various materials may comprise the patch of the present invention. Materials used may be animal, plant, metallic/mineral or synthetically derived. Examples of plant based materials include cotton, wool, felt, and polish cloth. The construction of these materials may be woven, non-woven, napped, and knitted. Other materials include flexible solids, including foams. Various properties may be imparted to the patch using these materials. By combining materials from different sources, absorbency, elasticity, flexibility and the degree of napping can be affected.

In addition to specific combinations of materials, the patch may comprise additional materials embedded in its fabric. In one preferred embodiment, patches are soaked with liquids for cleaning, chelating, lubricating, polishing and protecting the bore interior. Other materials may include fibers embedded with resin or heat, including coated nylon fibers, metal, metal ribbons, wire mesh, and steel wool adhered through resins, weaving, knitting, slurry, heat, chemical reactions or electrical charge. Still other embedded materials may include abrasives such as emery sand, carbide mesh, silicon carbide, borazon, ceramic, ceramic balls, zirconiuym alumina, zirconia balls, novaculite, microcapsules, microfibers, nanorods, fullerenes, rouge, diamond dust, diamond paste, silica, glass beads, glass powder, pumice, diatoms, microshells from clay, metal oxides, cerium oxide, calcite, aluminum oxide, and metal mesh. These abrasives may be embedded into wet or dry patches.

In addition to abrasives, the patch may comprise a backing material on at least one surface. The backing material can impart properties to the patch not found in the core patch material, such as rigidity, flexibility, and elasticity. The backing may be made of paper, natural fabric, synthetic materials or mesh.

The structure of the improved bore cleaning patch having been shown and described, use of the device will now be described:

The patch is used in a manner similar to firearm bore cleaning patches currently known in the art. The patch is used in conjunction with a jag. The jag may be solid, ribbed, non-ribbed, smooth, rough, swiveling, and made of various types of standard material. Additionally, the patches may be slipped inside a slotted jag, or through a jag eyelet. Bore brushes may also be used. A patch is wrapped around a sub-caliber bore brush with bristles to which the patch adheres.

Prior to use, a patch may be soaked or wetted with solvent to clean black powder or smokeless powder by-products, metal oxides, rust, other corrosion, or debris. Patches may also be wetted with lubricants and other chemicals, natural and synthetic, to protect bores from rust and corrosion, or to assist in bore reconditioning. The patches can be used to apply solvents, lubricants, liquids, paste, foam, abrasives, microcapsules or other materials to the bore interior, and clean patches can be used to remove these materials. They may also be used with powered machinery for mechanized ultrasonic, gas, or liquid emersion cleaning systems and for polishing.

Figure 5:
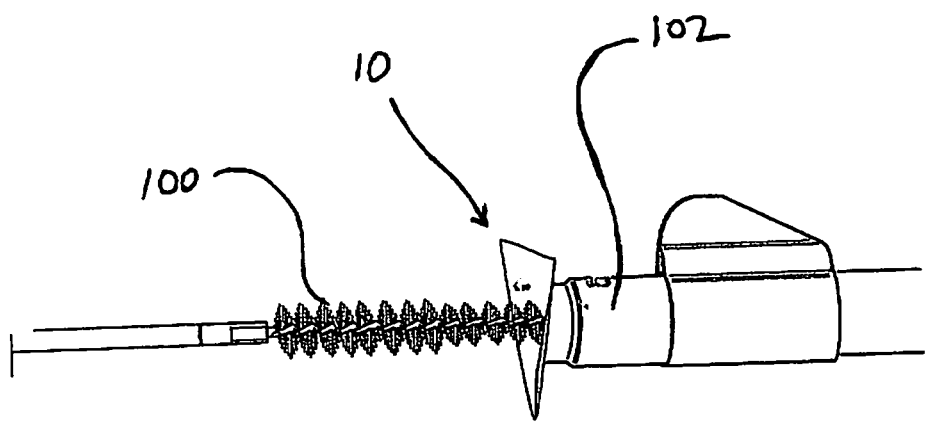
FIG. 5 is a side view of a patch disposed between a cleaning brush and the barrel of a firearm.
Figure 6:
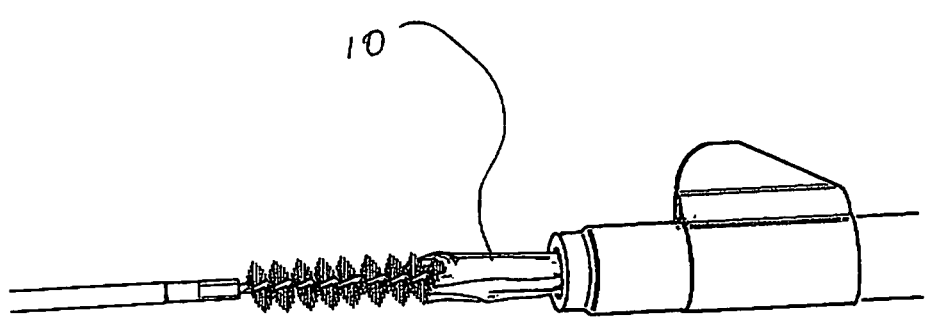
FIG. 6 is a side view of a patch disposed around a cleaning brush and exhibiting folding and pleating.

Referring to FIG. 5, the patch 10 is centered on a brush 100 or jag and aligned with the barrel 102 of a firearm. As the brush 100 is pushed into the barrel 102, the patch 10 depends into the space between the brush 100 and barrel 102. As the patch deforms, the edges of the patch begin to pleat with the extreme ends of the triangle shape disposed against the bore. By reciprocating action, the patch scrubs away debris from the bore interior. A view of the patch 10 after it has been inserted into a bore is shown in FIG. 6. In addition to cleaning, the patch may be wrapped around spherical shot or other projectiles and inserted into a bore to serve as wadding.

The structure and use of the improved bore cleaning patch having been shown and described, manufacture of the device will now be described:

An advantage of the triangular shape of the patches is that they may be cut using a tessellated die to produce very little or no waste. To manufacture the patches, the material comprising the patches is assembled in multi-layered sheets. A die, comprising the triangular pattern tessellated into a mosaic pattern so that adjacent triangles share common sides is used to cut through the material under pressure. Using this technique, only the material cut out to form notches or openings is wasted.

Regardless of the shape and size of the raw patch material from which the patch 10 of the present invention is made, the improved patch has specified configurations and dimensions permitting it to wrap around a brush or jag in an efficient manner. Notches 12a, 12b, 12c cut into the sides (i.e. perimeter edge 11) or adjacent to the sides 11 provide a space for excess folded patch material to fold into thereby reducing any bunching. In the preferred embodiment, with reference to one notch 12a in FIG. 1 for the sake of clarity, the notch 12a is cut with straight edges so as to form two edges 13a, 13b. Each edge 13a and 13b is parallel to one of the longitudinal axes. In this case, edge 13a is parallel to longitudinal axis L1 and edge 13b is parallel to longitudinal axis L2. Each notch is cut similarly so that each longitudinal axis L1, L2, L3 is parallel to two side edges as shown in FIG. 1. As shown in FIGS. 7-9, similar notch characteristics can be used where the raw patch material was a different shape, such as square (FIG. 7) or circle (FIGS. 8-9). Broken lines in FIGS. 7-9 indicate portions of the raw material that were cut out to create the notches shown. The cross-hatching indicates areas of pleating 20 when the patches are put to use.

Listed in Table 10 below are examples of patch configurations that are suitable for different bore sizes. In the Table below, "r" refers to the radius of the gun bore for the given caliber of the gun, 2s refers to the length of a side of a raw square patch, or the diameter of a raw circular patch. Radius refers to the distance from the center C of the patch 10 to the distal point D1, D2, or D3 on an end of the patch. Apothem A refers to the distance from the center C of the patch 10 to the point on the notch 12a, 12b, 12c that is closest to the center C, i.e. the proximal point P1, P2, P3. Radius/apothem refers to the ratio of the radius R of the patch to the apothem A.

TABLE 10

| caliber | r | 2s | patch shape and notches | radius | apothem | radius/apothem |
|---|---|---|---|---|---|---|
| 0.17 | 0.085 | 0.50 | equilateral triangle with notch in each side | 0.438691 | 0.255 | 1.720358 |
| 0.17 | 0.085 | 0.50 | square with notch in each side | 0.353553 | 0.255 | 1.386484 |
| 0.17 | 0.085 | 0.50 | round with three notches | 0.282095 | 0.255 | 1.106254 |
| 0.17 | 0.085 | 0.50 | round with four notches | 0.282095 | 0.255 | 1.106254 |
| 0.17 | 0.085 | 0.75 | equilateral triangle with notch in each side | 0.658037 | 0.255 | 2.580537 |
| 0.17 | 0.085 | 0.75 | square with notch in each side | 0.53033 | 0.255 | 2.079726 |
| 0.17 | 0.085 | 0.75 | round with three notches | 0.423142 | 0.255 | 1.659381 |
| 0.17 | 0.085 | 0.75 | round with four notches | 0.423142 | 0.255 | 1.659381 |
| 0.20 | 0.1 | 0.75 | equilateral triangle with notch in each side | 0.658037 | 0.3 | 2.193457 |
| 0.20 | 0.1 | 0.75 | square with notch in each side | 0.53033 | 0.3 | 1.767767 |
| 0.20 | 0.1 | 0.75 | round with three notches | 0.423142 | 0.3 | 1.410474 |
| 0.20 | 0.1 | 0.75 | round with four notches | 0.423142 | 0.3 | 1.410474 |
| 0.2 | 0.1 | 0.875 | equilateral triangle with notch in each side | 0.76771 | 0.3 | 2.559033 |
| 0.20 | 0.1 | 0.875 | square with notch in each side | 0.618718 | 0.3 | 2.062395 |
| 0.20 | 0.1 | 0.875 | round with three notches | 0.493666 | 0.3 | 1.645553 |
| 0.20 | 0.1 | 0.875 | round with four notches | 0.493666 | 0.3 | 1.645553 |
| 0.20 | 0.1 | 1.00 | equilateral triangle with notch in each side | 0.877383 | 0.3 | 2.924609 |
| 0.20 | 0.1 | 1.00 | square with notch in each side | 0.707107 | 0.3 | 2.357023 |
| 0.20 | 0.1 | 1.00 | round with three notches | 0.56419 | 0.3 | 1.880632 |
| 0.20 | 0.1 | 1.00 | round with four notches | 0.56419 | 0.3 | 1.880632 |
| 0.22 | 0.11 | 1.00 | equilateral triangle with notch in each side | 0.877383 | 0.33 | 2.658735 |
| 0.22 | 0.11 | 1.00 | square with notch in each side | 0.707107 | 0.33 | 2.142748 |
| 0.22 | 0.11 | 1.00 | round with three notches | 0.56419 | 0.33 | 1.709665 |
| 0.22 | 0.11 | 1.00 | round with four notches | 0.56419 | 0.33 | 1.709665 |
| 0.223 | 0.1115 | 1.00 | equilateral triangle with notch in each side | 0.877383 | 0.3345 | 2.622968 |
| 0.223 | 0.1115 | 1.00 | square with notch in each side | 0.707107 | 0.3345 | 2.113922 |
| 0.223 | 0.1115 | 1.00 | round with three notches | 0.56419 | 0.3345 | 1.686665 |
| 0.223 | 0.1115 | 1.00 | round with four notches | 0.56419 | 0.3345 | 1.686665 |
| 0.223 | 0.1115 | 1.125 | equilateral triangle with notch in each side | 0.987056 | 0.3345 | 2.950839 |
| 0.223 | 0.1115 | 1.125 | square with notch in each side | 0.795495 | 0.3345 | 2.378162 |
| 0.223 | 0.1115 | 1.125 | round with three notches | 0.634713 | 0.3345 | 1.897499 |
| 0.223 | 0.1115 | 1.125 | round with four notches | 0.634713 | 0.3345 | 1.897499 |
| 0.223 | 0.1115 | 1.25 | equilateral triangle with notch in each side | 1.096728 | 0.3345 | 3.27871 |
| 0.223 | 0.1115 | 1.25 | square with notch in each side | 0.883883 | 0.3345 | 2.642402 |
| 0.223 | 0.1115 | 1.25 | round with three notches | 0.705237 | 0.3345 | 2.108332 |
| 0.223 | 0.1115 | 1.25 | round with four notches | 0.705237 | 0.3345 | 2.108332 |
| 0.243 | 0.1215 | 1.25 | equilateral triangle with notch in each side | 1.096728 | 0.3645 | 3.008857 |
| 0.243 | 0.1215 | 1.25 | square with notch in each side | 0.883883 | 0.3645 | 2.42492 |
| 0.243 | 0.1215 | 1.25 | round with three notches | 0.705237 | 0.3645 | 1.934807 |
| 0.243 | 0.1215 | 1.25 | round with four notches | 0.705237 | 0.3645 | 1.934807 |
| 0.243 | 0.1215 | 1.50 | equilateral triangle with notch in each side | 1.316074 | 0.3645 | 3.610628 |
| 0.243 | 0.1215 | 1.50 | square with notch in each side | 1.06066 | 0.3645 | 2.909904 |
| 0.243 | 0.1215 | 1.50 | round with three notches | 0.846284 | 0.3645 | 2.321768 |
| 0.243 | 0.1215 | 1.50 | round with four notches | 0.846284 | 0.3645 | 2.321768 |
| 0.27 | 0.135 | 1.75 | equilateral triangle with notch in each side | 1.53542 | 0.405 | 3.79116 |
| 0.270 | 0.135 | 1.75 | square with notch in each side | 1.237437 | 0.405 | 3.0554 |
| 0.270 | 0.135 | 1.75 | round with three notches | 0.987332 | 0.405 | 2.437856 |
| 0.270 | 0.135 | 1.75 | round with four notches | 0.987332 | 0.405 | 2.437856 |
| 0.3 | 0.15 | 1.75 | equilateral triangle with notch in each side | 1.53542 | 0.45 | 3.412044 |
| 0.30 | 0.15 | 1.75 | square with notch in each side | 1.237437 | 0.45 | 2.74986 |
| 0.30 | 0.15 | 1.75 | round with three notches | 0.987332 | 0.45 | 2.194071 |
| 0.30 | 0.15 | 1.75 | round with four notches | 0.987332 | 0.45 | 2.194071 |
| 0.30 | 0.15 | 2.00 | equilateral triangle with notch in each side | 1.754765 | 0.45 | 3.899479 |
| 0.30 | 0.15 | 2.00 | square with notch in each side | 1.414214 | 0.45 | 3.142697 |
| 0.30 | 0.15 | 2.00 | round with three notches | 1.128379 | 0.45 | 2.507509 |
| 0.30 | 0.15 | 2.00 | round with four notches | 1.128379 | 0.45 | 2.507509 |
| 0.338 | 0.169 | 2.00 | equilateral triangle with notch in each side | 1.754765 | 0.507 | 3.461076 |
| 0.338 | 0.169 | 2.00 | square with notch in each side | 1.414214 | 0.507 | 2.789376 |

TABLE 10-continued

| caliber | r | 2s | patch shape and notches | radius | apothem | radius/apothem |
|---|---|---|---|---|---|---|
| 0.338 | 0.169 | 2.00 | round with three notches | 1.128379 | 0.507 | 2.2256 |
| 0.338 | 0.169 | 2.00 | round with four notches | 1.128379 | 0.507 | 2.2256 |
| 0.357 | 0.1785 | 2.25 | equilateral triangle with notch in each side | 1.974111 | 0.5355 | 3.686482 |
| 0.357 | 0.1785 | 2.25 | square with notch in each side | 1.59099 | 0.5355 | 2.971037 |
| 0.357 | 0.1785 | 2.25 | round with three notches | 1.269427 | 0.5355 | 2.370544 |
| 0.357 | 0.1785 | 2.25 | round with four notches | 1.269427 | 0.5355 | 2.370544 |
| 0.357 | 0.1785 | 2.50 | equilateral triangle with notch in each side | 2.193457 | 0.5355 | 4.096091 |
| 0.357 | 0.1785 | 2.50 | square with notch in each side | 1.767767 | 0.5355 | 3.301152 |
| 0.357 | 0.1785 | 2.50 | round with three notches | 1.410474 | 0.5355 | 2.633938 |
| 0.357 | 0.1785 | 2.50 | round with four notches | 1.410474 | 0.5355 | 2.633938 |
| 0.375 | 0.1875 | 2.50 | equilateral triangle with notch in each side | 2.193457 | 0.5625 | 3.899479 |
| 0.375 | 0.1875 | 2.50 | square with notch in each side | 1.767767 | 0.5625 | 3.142697 |
| 0.375 | 0.1875 | 2.50 | round with three notches | 1.410474 | 0.5625 | 2.507509 |
| 0.375 | 0.1875 | 2.50 | round with four notches | 1.410474 | 0.5625 | 2.507509 |
| 0.40 | 0.2 | 2.50 | equilateral triangle with notch in each side | 2.193457 | 0.6 | 3.655761 |
| 0.40 | 0.2 | 2.50 | square with notch in each side | 1.767767 | 0.6 | 2.946278 |
| 0.40 | 0.2 | 2.50 | round with three notches | 1.410474 | 0.6 | 2.35079 |
| 0.40 | 0.2 | 2.50 | round with four notches | 1.410474 | 0.6 | 2.35079 |
| 0.45 | 0.225 | 2.50 | equilateral triangle with notch in each side | 2.193457 | 0.675 | 3.249565 |
| 0.45 | 0.225 | 2.50 | square with notch in each side | 1.767767 | 0.675 | 2.618914 |
| 0.45 | 0.225 | 2.50 | round with three notches | 1.410474 | 0.675 | 2.089591 |
| 0.45 | 0.225 | 2.50 | round with four notches | 1.410474 | 0.675 | 2.089591 |
| 0.45 | 0.225 | 3.00 | equilateral triangle with notch in each side | 2.632148 | 0.675 | 3.899479 |
| 0.45 | 0.225 | 3.00 | square with notch in each side | 2.12132 | 0.675 | 3.142697 |
| 0.45 | 0.225 | 3.00 | round with three notches | 1.692569 | 0.675 | 2.507509 |
| 0.45 | 0.225 | 3.00 | round with four notches | 1.692569 | 0.675 | 2.507509 |
| 0.50 | 0.25 | 3.00 | equilateral triangle with notch in each side | 2.632148 | 0.75 | 3.509531 |
| 0.50 | 0.25 | 3.00 | square with notch in each side | 2.12132 | 0.75 | 2.828427 |
| 0.50 | 0.25 | 3.00 | round with three notches | 1.692569 | 0.75 | 2.256758 |
| 0.50 | 0.25 | 3.00 | round with four notches | 1.692569 | 0.75 | 2.256758 |
| 0.58 | 0.29 | 3.00 | equilateral triangle with notch in each side | 2.632148 | 0.87 | 3.025458 |
| 0.58 | 0.29 | 3.00 | square with notch in each side | 2.12132 | 0.87 | 2.438299 |
| 0.58 | 0.29 | 3.00 | round with three notches | 1.692569 | 0.87 | 1.945481 |
| 0.58 | 0.29 | 3.00 | round with four notches | 1.692569 | 0.87 | 1.945481 |
| 0.617 | 0.3085 | 3.00 | equilateral triangle with notch in each side | 2.632148 | 0.9255 | 2.844028 |
| 0.617 | 0.3085 | 3.00 | square with notch in each side | 2.12132 | 0.9255 | 2.29208 |
| 0.617 | 0.3085 | 3.00 | round with three notches | 1.692569 | 0.9255 | 1.828816 |
| 0.617 | 0.3085 | 3.00 | round with four notches | 1.692569 | 0.9255 | 1.828816 |
| 0.729 | 0.3645 | 3.00 | equilateral triangle with notch in each side | 2.632148 | 1.0935 | 2.407086 |
| 0.729 | 0.3645 | 3.00 | square with notch in each side | 2.12132 | 1.0935 | 1.939936 |
| 0.729 | 0.3645 | 3.00 | round with three notches | 1.692569 | 1.0935 | 1.547845 |
| 0.729 | 0.3645 | 3.00 | round with four notches | 1.692569 | 1.0935 | 1.547845 |

As shown from Table 10, the ratio of the radius R to the apothem A is generally greater than 1. Preferably, the ratio is approximately 1.5 or more. Most preferably, the ratio is 2 or more. In some embodiments, the ratio can be 3 or more. Some ratios are greater than 4. Furthermore, to select the correct size patch for a particular bore, the ratio of the apothem A to the bore size r is preferably approximately 3.

All features disclosed in this specification, including any accompanying claims, abstract, and drawings, may be replaced by alternative features serving the same, equivalent or similar purpose, unless expressly stated otherwise. Thus, unless expressly stated otherwise, each feature disclosed is one example only of a generic series of equivalent or similar features.

Although preferred embodiments of the present invention have been shown and described, various modifications and substitutions may be made thereto without departing from the spirit and scope of the invention. Accordingly, it is to be understood that the present invention has been described by way of illustration and not limitation.

What is claimed is:

1. An improved cleaning patch device for firearm bores, comprising:
   a. a planar patch having a center and at least three ends protruding radially away from the center and terminating at a distal point, each end defining a longitudinal axis through the center and each respective distal point; and
   b. a plurality of notches, one notch formed in between two ends, wherein each notch is formed by two edges deviating inwardly toward the center, wherein each edge is parallel to one of the longitudinal axes.

2. The patch device of claim 1, wherein when the patch is inserted into a firearm bore using a jag, each end depends over the jag causing an excess patch material along each end to fold and pleat in substantially the same pattern, and wherein each notch provides space to accommodate pleated patch material.

3. The patch device of claim 2, wherein the hole is at the center of the patch.

4. The patch device of claim 2, comprising a plurality of holes, wherein the plurality of holes are evenly spaced apart from each other around the center of the patch.

5. The patch device of claim 1, wherein the patch further comprises a hole.

6. The device of claim 1, wherein the patch comprises an abrasive.

7. The device of claim 1, wherein the patch is between 0.013 inches and 0.023 inches in thickness.

8. The device of claim 7, wherein steel wool is incorporated into the fabric.

9. The device of claim 1, wherein the patch comprises an added material incorporating an abrasive.

10. The device of claim 1, wherein the patch comprises a material incorporating a cleaning agent.

11. The device of claim 1, wherein the patch comprises a backing material.

12. The device of claim 1, wherein the patch is impregnated with structures chosen from the list of: microcapsules, microfibers, nanorods, and fullerenes.

13. An improved cleaning patch device for firearm bores comprising:
   a. a planar patch having a center and at least three ends, each end terminating at a distal point, wherein a distance from the center to any of the three ends defines a radius; and
   b. a notch formed in the patch in between two ends, wherein a distance from the center to a point on the notch closest to the center defines an apothem, wherein a ratio of the radius to the apothem is at least approximately 1.1.

14. The patch device of claim 13, wherein the ratio of the radius to the apothem is at least approximately 1.5.

15. The patch device of claim 13, wherein the ratio of the radius to the apothem is at least approximately 2.

16. The cleaning patch device of claim 13, wherein when the patch is inserted into a firearm bore using a jag, each end depends over the jag causing the excess patch material along each arm to fold and pleat in substantially the same pattern, wherein each notch provides space to accommodate pleated patch material, and wherein a surface portion of the patch extending from the patch center to each end of the patch comes into direct contact with the bore.

17. An improved cleaning patch device for firearm bores, comprising:
   a. a planar patch having a perimeter, a center, and at least three ends protruding radially away from the center and terminating at a distal point, each end defining a longitudinal axis through the center and each respective distal point; and
   b. a plurality of openings formed within the perimeter, each opening having an axis of symmetry, wherein one opening is formed along each of the longitudinal axes.

18. The patch of claim 17, wherein each longitudinal axis bisects its respective opening along its axis of symmetry.

19. The patch of claim 17, wherein when the patch is inserted into a firearm bore using a jag, each end depends over the jag causing an excess patch material along each end to fold and pleat in substantially the same pattern, and wherein each opening provides space to accommodate pleated patch material.

20. The patch device of claim 17, wherein the patch further comprises a hole at the center.

* * * * *